Jan. 13, 1959 T. H. KENNERTY 2,867,953
ATTACHMENT FOR SAW GRINDING MACHINES
Filed July 23, 1958
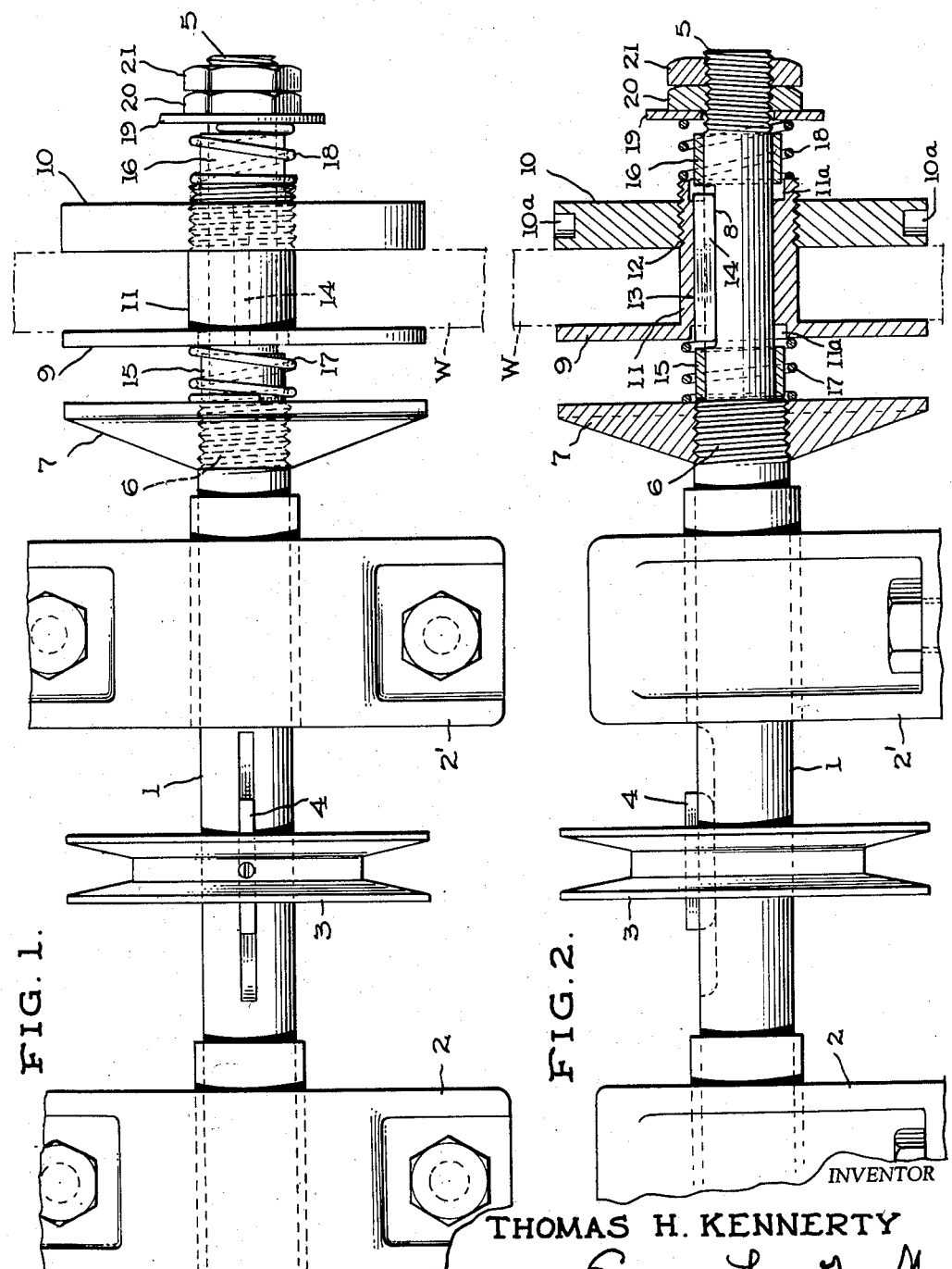
INVENTOR
THOMAS H. KENNERTY
BY Emory L. Groff
ATTORNEY 2,867,953
Patented Jan. 13, 1959

2,867,953
ATTACHMENT FOR SAW GRINDING MACHINES

Thomas H. Kennerty, Moncks Corner, S. C.

Application July 23, 1958, Serial No. 750,501

3 Claims. (Cl. 51—168)

This invention relates to an attachment for the arbor of a grinding machine of the type used for grinding the teeth of saws. The purpose of the attachment is to provide a yieldable and axially movable unit to prevent burning or casehardening of the saw teeth during the grinding operation.

In grinding saw teeth it is customary to use an abrasive wheel connected to a rotatable arbor; however, when performing the grinding operation, the saw teeth are frequently burned and casehardened due to an excessive amount of pressure being exerted on the teeth, causing them to become excessively brittle and thus subject to breakage when the saw is in use.

A distinctive feature of this invention is to provide means which may be easily and accurately controlled for defining the degree of axial movement of the grinding wheel on the arbor under the force of compressed springs. That is to say, it is proposed to provide a construction which permits the grinding wheel to be subjected to the desired degree of spring force so that the wheel will run true in performing work which is forced toward the wheel at an oblique angle to its axis. This clamping force on the hub may be relatively light, so long as it holds the wheel properly for the work to be performed, and yet on the other hand where it is desired to hold the wheel yieldingly in place to resist greater thrust, a simple adjustment may be made which will readily and quickly effect the desired result.

Accordingly, it is the primary object of my invention to provide practical and inexpensive means which may be readily attached to the arbor of a grinding machine to afford positive yieldable adjustment for the grinding wheel when it is brought to bear against the teeth of a saw so as to obviate burning or casehardening.

With this and other objects in view, which will more readily appear as the nature of the invention is better understood, the invention consists in the novel construction, combination, and arrangement of parts, hereinafter more fully described, illustrated and claimed.

A preferred and practical embodiment of the invention is shown in the accompanying drawings, in which:

Figure 1 is a top plan view of the arbor of a saw grinding machine showing the attachment in position at the outer end of the arbor.

Figure 2 is a side elevational view partly in section showing the parts of the attachment in assembled relationship.

Similar reference characters designate corresponding parts throughout the several figures of the drawing.

The arbor 1 is rotatably mounted in pillow block bearings 2, 2', which in turn are fixed to an appropriate supporting surface. A V-pulley 3 is connected to the arbor by means of a key 4 and is driven by a drive belt and motor, not shown. The aforementioned parts are conventional and form no part of my invention.

The portion of the arbor 1 which extends outwardly beyond bearing 2' has a threaded end portion 5 and spaced inwardly therefrom the arbor is threaded at 6 to receive a collar 7. Between the threaded areas 5 and 6 a longitudinally extending keyway 8 is formed in the arbor 1.

A conventional grinding wheel W is supported on arbor 1 by means of clamping it between a pair of plates 9 and 10. The plate 9 is provided with a centrally located hub 11 externally threaded at its outer end to receive the internally threaded bore 12 of plate 10 and thus securely clamp wheel W therebetween.

In order to provide means for tightening the grinding wheel between the plates 9 and 10, the outer circumferential edge of plate 10 is provided with a plurality of spaced openings 10a into which a spanner wrench may be inserted to tighten plate 10.

The hub 11 is countersunk at both ends as indicated at 11a, and its inner surface is provided with a longitudinal keyway 13. A key 14 of less length than the keyway 8 in arbor 1 slidably fits into keyway 8 and keyway 13 of the hub 11 to thereby lock the wheel W to the arbor 1 for rotation therewith.

The means for controlling and relieving the pressure applied to the grinding wheel during the grinding operation comprises a pair of bushings 15, 16, a pair of coil springs 17, 18, a movable collar 19, and a pair of nuts 20 and 21.

After the grinding wheel has been assembled between the plates 9 and 10 as previously described, bushing 15 is slipped over arbor 1 so that it abuts collar 7. Spring 17 is then placed over the bushing 15 also abutting collar 7. The assembled grinding wheel W is then placed on arbor 1 with keyway 13 of the hub 11 in alignment with keyway 8 and key 14 on the arbor 1. Bushing 16 and spring 18 are then slipped over the arbor and movable collar 19 is placed so that it will form an outer abutment wall for spring 18. Nut 20 is then threaded on end 5 of the arbor and tightened until it engages collar 19. Nut 21 is then threaded on end 5 of arbor 1 and is tightened until it abuts nut 20. By slightly backing off nut 20 the nuts will be locked and thereby prevent the assembly from coming off of the arbor 1 during operation. The extent of axial longitudinal movement of the grinding wheel W can be decreased or increased by tightening or loosening of the nuts 20 and 21.

With the parts thus assembled, the machine is ready for operation, and when the grinding wheel W is moved into contact with the tooth of a saw, it will yield under pressure against the tension of either spring 17 or 18, depending upon how far the nut 20 is screwed up on the threaded end 5 of the arbor 1. Advancing of the nut 20 against collar 19 will cause the latter to push the spring 18 against the hub 11 and bushing 16 against key 14. The opposite end of key 14 will in turn be pressed against bushing 15, causing it to strike collar 7. Pressure exerted on spring 18 by advancing collar 19 due to tightening of nut 20 causes the grinding wheel to move longitudinally inwardly, thereby causing plate 9 to engage and compress spring 17 confined between said plate and collar 7.

The hub 11 being countersunk at both ends, leaves it free to move against the tension of springs 17 and 18 when pressure is applied to either side of the wheel W. Thus, undue pressure on the saw tooth will be relieved sufficiently to prevent burning and casehardening of the tooth. The same results are obtained when grinding the back of the saw tooth. The degree of axial longitudinal movement of the grinding wheel assembly is limited by the abutment of either bushing 15 or 16 with the key 14. By varying the length of the bushings or the key the limits of longitudinal movement can be either decreased or increased.

From the foregoing it will be apparent that the novel arrangement of parts of my invention provides a positive and effective means of relieving uneven and undesirable pressure on the saw tooth during the grinding operation and further provides a simple means of adjustment to obtain the desired results.

I claim:

1. A unit for adjusting and controlling the axial movement of a grinding wheel mounted on a driven arbor, said arbor having a longitudinal keyway and threads at its outer end, comprising, in combination, a fixed collar on said arbor, a movable collar slidable on the arbor over the threads thereon, adjustable nut means on said arbor threads for actuating said movable collar; a wheel carrying hub disposed between said fixed and movable collars and having a fixed plate at one end and external threads on the other end, a locking plate threaded for engagement with said threads on the hub, said hub having annular recesses at opposite ends thereof, a key in said arbor keyway for non-rotatably securing the hub to the arbor, said key of less length than the keyway, bushings surrounding the arbor at each side of the hub and disposed between the same and said collars, springs coiled about said bushings and located between facing sides of the hub and the collars, whereby, when the adjusting nut means is advanced toward the movable collar the tension of both springs will be increased, the bushings will engage said key, thereby controlling the axial movement of said grinding wheel.

2. An attachment for grinding machines having a rotatable arbor with a key slot in the outer end of said arbor, a key slidable in said slot, a grinding wheel clamped between a pair of opposed plates and secured to said arbor by said key, one of said plates having a hub with a bore therethrough, means for controlling axial longitudinal movement of said wheel on said arbor, said means comprising, a first collar fixed to said arbor on one side of said grinding wheel, a second collar slidable on said arbor and located on the opposite side of said grinding wheel, a pair of bushings slidable on said arbor and located on opposite sides of said grinding wheel between said wheel and said collars, a pair of springs surrounding each of said bushings and confined between said plates and said collars and adjustment means for controlling the sliding movement of said second collar to adjust the tension of said springs.

3. The attachment for grinding machines according to claim 2, wherein the bore of said hub is countersunk at both ends.

References Cited in the file of this patent

UNITED STATES PATENTS

| 158,617 | Bannister et al. | Jan. 2, 1875 |
| 162,010 | Bannister | Apr. 13, 1875 |
| 179,500 | Andrews | July 4, 1876 |
| 307,665 | Long | Nov. 4, 1884 |
| 1,153,297 | Elrod | Sept. 14, 1915 |